Oct. 14, 1952     F. M. ARCHIBALD     2,613,811
CONTINUOUS SETTLING APPARATUS

Filed Dec. 9, 1948     4 Sheets-Sheet 3

Francis M. Archibald Inventor

By *illegible* Attorney

Oct. 14, 1952 F. M. ARCHIBALD 2,613,811
CONTINUOUS SETTLING APPARATUS
Filed Dec. 9, 1948 4 Sheets-Sheet 4

Francis M. Archibald Inventor
By *(signature)* Attorney

Patented Oct. 14, 1952

2,613,811

UNITED STATES PATENT OFFICE 2,613,811

CONTINUOUS SETTLING APPARATUS

Francis M. Archibald, Elizabeth, N. J., assignor to Standard Oil Development Company, a corporation of Delaware Application December 9, 1948, Serial No. 64,321

6 Claims. (Cl. 210—54)

The present invention relates to a method and to apparatus for the separation of emulsified materials such as the separation of sludge or sludge-like materials from a liquid emulsion, or for the separation of other emulsions of substantially immiscible liquids, or of liquid and solid materials. The method and apparatus are particularly adapted for use in connection with the manufacture of valuable products from hydrocarbon materials, including those from the treatment of such materials with large quantities of sulfuric acid.

Such treatment, for example in the manufacture of white oils and sulfonates, may consist of the treatment of a petroleum oil distillate with large quantities of sulfuric acid. The acid may be fuming acid equivalent to 104.5% sulfuric acid, applied to the petroleum oil in a series of from three to six treats at the rate of about three-quarter pound of acid per gallon of oil. This treatment produces considerable quantities of acid sludge which must be removed at each stage. Substantially complete and prompt sludge removal is of particular importance to avoid the degradation of product color which results from extended contact of sludge and treated oil. Removal of sludge is of particular importance in those treating stages immediately preceding recovery of sulfonate materials. Removal of the acid sludge formed between stages is also important from the standpoint of efficient acid utilization.

In the conventional system, removal of acid sludge is carried out by continuously flowing the acid oil-sludge emulsion from a treating agitator through a horizontal gravity settling tank which, with an emulsion feed rate of about 725 G. P. H. may require a settler capacity of about 6500 gallons and a residence time of materials therein of eight or more hours. Furthermore, satisfactory operation of such a settler requires maintenance of a 2 to 3 foot layer of sludge in the bottom. In such an operation the long residence time, and excessive contact of treated oil with the sludge layer has a deleterious effect on color characteristics of the products recovered. In some instances, it is necessary to supplement the use of a settling tank by use of a centrifuge at the stages preceding sulfonate recovery.

It is an object of the present invention to provide for the more rapid and more efficient separation of sludge and sludge-like materials produced in the manufacture of hydrocarbon products. More particularly, it is an object of the invention to reduce the settling time, and to increase the through-put rate of emulsified materials in a separator therefor. It is also an object of the invention to separate two fluid materials continuously by gravity in a counterflow system, the material present in minor proportion being separated to flow countercurrent to the main stream of materials through the system, with continuous removal of the separated materials therefrom. A further object of the invention is to provide a method and means for separating acid sludge from oils heavily treated with sulfuric acid, in which settlement time and volume of oil hold-up are reduced, sludge separation improved, and excessive contact between sludge and treated oils avoided.

Fig. 1a is a view similar to that of Fig. 1 showing a portion of the apparatus illustrated in Fig. 1 and including means for automatic control of feed to the chamber 3 and for discharge therefrom.

Figure 1:
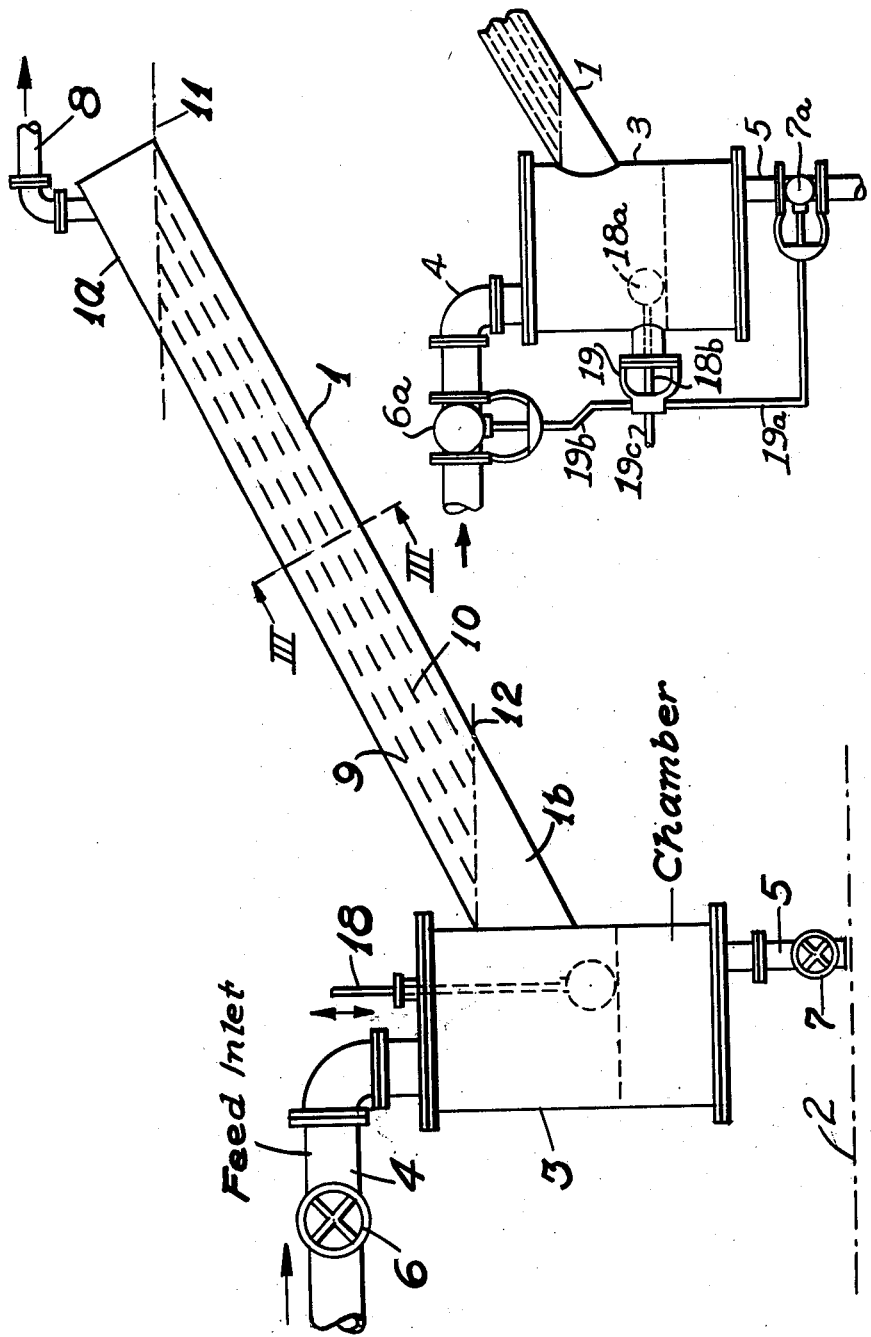
Figure 1 is a schematic view in side elevation of one form of the apparatus.

Referring more specifically to the drawings, the numeral 1 designates the shell of a separator vessel. As shown, this vessel is cylindrical in form, and is disposed angularly with reference to its base plane as represented by the broken line 2. This angular relationship is variable, but an angle between 30° and 60° is preferred to provide an optimum volume in the accumulating zones 1a and 1b. At its lower end, the vessel 1 communicates with a receiver chamber 3, which may be a separate element as shown, or may be formed integrally with the vessel. An inlet feed line 4 opens into the upper portion of the chamber 3, and a discharge line 5 opens from the lower portion thereof. Preferably, control valves 6 and 7 are provided in the respective lines. An outlet line 8 for the vessel 1 is provided at the upper end thereof.

Interiorly, the vessel 1 is provided with a plurality of narrow, elongated passageways 9, which in the apparatus illustrated are formed by dividing plates 10, extending longitudinally of the vessel in substantially closely spaced relation one to another and to the vessel walls. Normally the passageways 9 are formed by plates 10 spaced vertically from plate to plate by not more than about 3 inches, and preferably, about 1½ to 2 inches. Also, the plate members 10 are so disposed that their upper and lower ends respectively, and the upper and lower ends respectively of the passageways 9, lie in the same relative planes, indicated by broken lines 11 and 12, and so that these planes are parallel to each other and to the base plane 2. When thus disposed, a chamber 1a is formed in the upper portion of the vessel 1, and a chamber 1b in the lower portion thereof.

Figure 3:
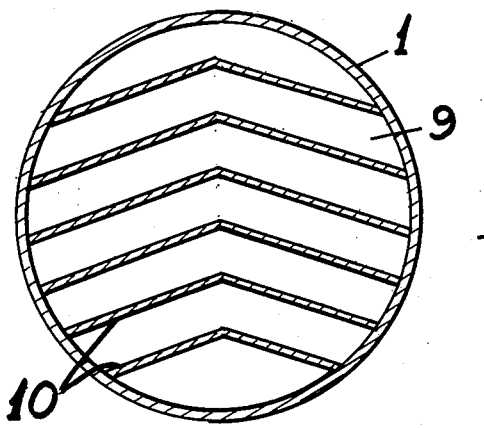
Figure 3 is a sectional view through apparatus according to Figure 1 along the line III—III thereof.
Figure 4:
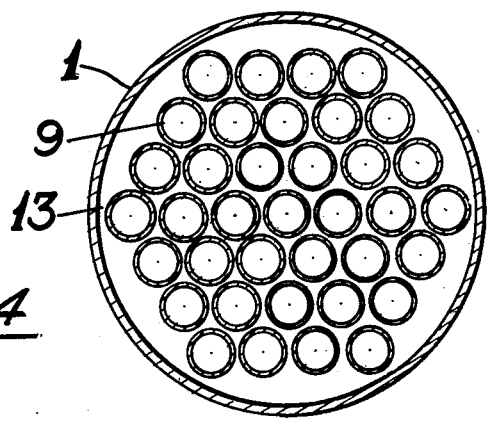
Figures 4, 5, 6 and 7 are sectional views similar to that of Figure 3 showing alternate interior construction.

In the construction shown by Figure 3, the passageways 9 are formed by means of a plurality of dividing plate members 10 of inverted V-shape, disposed in closely fitted relation to the vessel walls. Where desirable, these plates may be pre-assembled and inserted in the vessel as a unit. Also, as indicated, the passageways 9 may be formed in other ways. In the apparatus illustrated by Figure 4, the passageways are formed by means of a plurality of tangentially contacting tubular elements 13, substantially completely filling the vessel 1. If desired, these tubes may open into the upper and lower portions, 1a and 1b, respectively, through any suitable form of header plate.

Figure 5:
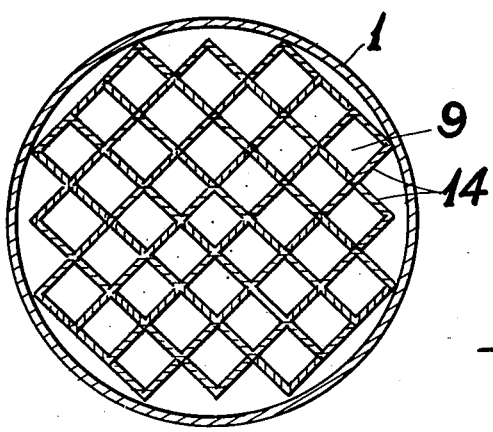
Figure 6:
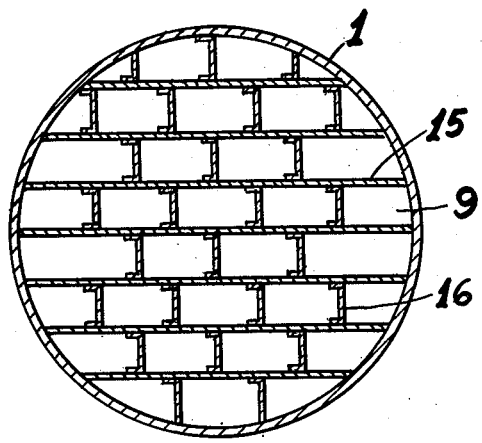

As shown in Figure 5, the passageways 9 are formed by a honeycombed arrangement of dividing plate members 14. In the form illustrated by Figure 6, flat plate members 15, disposed laterally across the vessel 1, are spaced vertically, and separated by a plurality of web members 16 in alternate relation from plate to plate to form several rows of rectangular passageways 9 longitudinally of the vessel.

Figure 7:
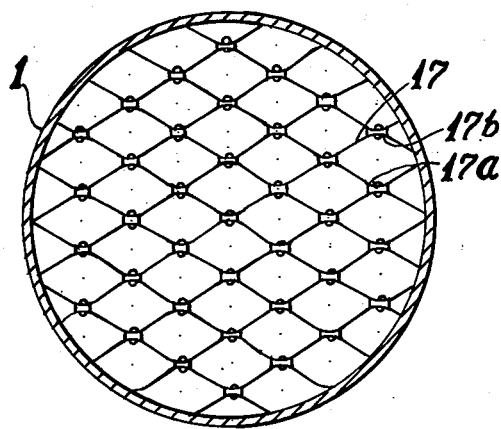

Figure 7 illustrates a form of construction in which the passageways 9 are defined by means of a series of deeply corrugated plate members 17 disposed laterally of the vessel 1 with the downwardly extending corrugations of one element in contact with the upwardly extending corrugations of the plate next below. The corrugations in contact may be secured to one another by rivets or bolts 17a, with or without spacer-seal strips 17b.

In operation, an emulsified material is fed to the receiver 3 by way of line 4. This material then passes upwardly through the vessel 1 by way of the passageways 9 therein. In each of the passageways 9, the heavier of the emulsified materials settles out of the emulsion during passage through the vessel and flows by gravity downwardly over the dividing plate members 10 shown in Figure 3, or the equivalent elements illustrated in Figures 3 to 6 inclusive. The lighter materials in the emulsion continue to flow upwardly through the passageways 9 to collect in the upper accumulating zone 1a, whence they may be withdrawn by way of line 8. The heavier materials settling out in the passageways flow downwardly in counter-current relation to the incoming fresh feed from the receiver 3, and the separated lighter materials in the passageways 9. The heavier materials pass from the vessel, by way of the lower accumulating zone 1b, into the lower portion of the receiver 3, whence they are withdrawn by way of line 5 through valve 7. If desired, a float type indicator 18 or other suitable means is provided to permit maintenance of a predetermined level of heavier materials in the lower portion of the receiver 3. Additional and conventional means may also be provided for automatic control of feed to the receiver and for discharge of the heavier materials from the receiver to automatically maintain any predetermined level of heavier materials in the receiver. Such means is shown in Fig. 1a as comprising a conventional air valve mechanism 19 mounted on a side wall of the chamber 3 and connected by means of transmission lines 19a and 19b to air-operated valve mechanism 6a and 7a in lines 4 and 5 respectively. The valve 19 is also connected to a source of compressed air, not shown, as by means of the line 19c and is actuated by means of a float 18a interiorly of the chamber 3 which is connected to the valve 19 as by means of a lever rod 18b. Other conventional control and actuating means may be similarly employed. Any suitable means for providing a fluid-tight seal for the rod 18b may be employed in the mounting of the air valve mechanism and the float operating means therefor. As shown in Figs. 1 and 1a, the indicator floats 18 and 18a are buoyant in the heavier separated material. Changes in the predetermined level of the heavier separated material will be transmitted by means of the float 18a and rod 18b to actuate valve 19, and in turn either or both of the valves 6a and 7a so as to establish and maintain the desired level of the heavier separated material in the chamber 3. Preferably, and as shown, in Figs. 1 and 1a, this level will be intermediate the entrance to the separator shell 1 from the chamber 3 and the outlet for heavier material from chamber 3.

It is intended that the dimensions of the vessel 1 and the feed rate of material entering through line 4 as well as the discharge rate through line 5 and line 8 shall be adjusted so that substantially all of the heavier materials to be removed from the emulsion fed into the system will be separated therefrom during passage of the materials through the several relatively shallow compartments or passageways 9 from the lower to the upper end of the vessel 1.

Inasmuch as in the operation contemplated, the component materials of the feed through line 4 will be of substantially different specific gravity and substantially immiscible one with another, little or no mixing of the separated heavier material with the lighter material will take place within the passageways 9. Also the heavier materials discharging from the lower ends of the passageways will be found to maintain their identity in passing through the emulsion feed entering the vessel 1 through the lower accumulating zone 1b, and will flow into the lower portion of the receiver 3 without re-emulsification, to be collected and removed. In any event, due to the differences in gravity between the separated material and either the emulsified feed or partially separated materials, re-emulsification at the feed end of the apparatus will be found to be inconsequential.

In any form of the apparatus illustrated, a common principle should be evident as governing the construction thereof, namely, the provision of a plurality of comparatively shallow disengaging passageways for emulsified feed materials, which passageways are disposed in spaced relation to either end of the separating vessel with their lower and upper ends respectively in common parallel planes, and in which these planes are also substantially parallel to a base plane for the apparatus. By such means, flow through the vessel is distributed through a plurality of parallel passageways which start and end at two levels only.

Illustrating the application of this invention, apparatus substantially as described above in which the vessel consisted of a 20 ft. length of 6" pipe disposed at an angle of 30° from a horizontal base plane was operated with an emulsion feed obtained from the sulfuric acid treatment of a white oil. The apparatus was operated at settled-oil flow rates of from 12 to 96 gallons per hour. The feed entering the apparatus contained about 15% by volume of acid oil sludge. The dividing plate members employed in the vessel used were of the type illustrated in Figures 3 and 5 respectively. The reduction in volume percent of sludge content obtained by use of the apparatus described is indicated by Table I.

By comparison, the same feed material separated in the conventional horizontal gravity settling tank produces a settled acid oil having a sludge content of from 3.5 to 4.0 volume percent when operated with a linear velocity through the tank of 0.04 foot per minute and a residence time of material in the tank of 8+ hours. The foregoing results indicate the effectiveness and speed of separation obtained in the operation set forth. It has long been known that the extended contact of acid oil and sludge in the horizontal type tank settlers conventionally used results in degradation of the treated oil color due to separation from the sludge of various colored materials. The decreased residence time in the tube type settler now disclosed minimizes opportunity for decomposition of the sludge with a resulting effect on the treated oil color.

The performance and structural characteristics of a tube type settler having a throughput capacity equivalent to that of a 6500 gallon tank type settler is indicated by comparison in Table II.

*Table I*

| Settled Acid Oil Flow Rate, G. P. H. | Sludge Content, vol. percent | | | Residence Time, hr. | Linear Velocity, ft./min. |
|---|---|---|---|---|---|
| | Emulsion Feed | Settled Acid Oil | | | |
| | | Three Plates | Honey-comb | | |
| 12.0 | 16.9 | 0.4 | 0.3 | 2.50 | 0.133 |
| 24.0 | 15.8 | 0.4 | 0.4 | 1.25 | 0.267 |
| 48.0 | 16.0 | 1.0 | 0.7 | 0.625 | 0.533 |
| 72.0 | 16.5 | 1.3 | 1.1 | 0.416 | 0.800 |
| 96.0 | 17.0 | 4.2 | 3.0 | 0.312 | 1.07 |

*Table II*

| Characteristic or Result Obtained | Type of Settler | |
|---|---|---|
| | Tank-Type Settler | Tube-Type Settler |
| Capacity, gal | 6,500 | 450 |
| Reduction in Oil Hold-up, percent | | 93 |
| Sludge Content of Settled Oil, vol. percent | 3.5-4.0 | 1.0 |
| Required Residence Time, hr | 8+ | 0.5 |
| Maximum Flow Rate, G. P. H | 725 | 725 |
| Treated Oil Color, TR (Tag-Robinson) | 12 | 15-20 |

The method and apparatus described may also be employed for other purposes than described with reference to Fig. 1. For example, the apparatus illustrated in Fig. 2 may be employed for the clarification of sulfuric acid emulsions recovered from a process for absorption of olefins, as in connection with the manufacture of alcohols. In such an operation, the emulsion to be separated will consist of a major portion of a heavy material such as sulfuric acid, and a minor portion of a material such as a tar oil of lighter specific gravity.

Figure 2:
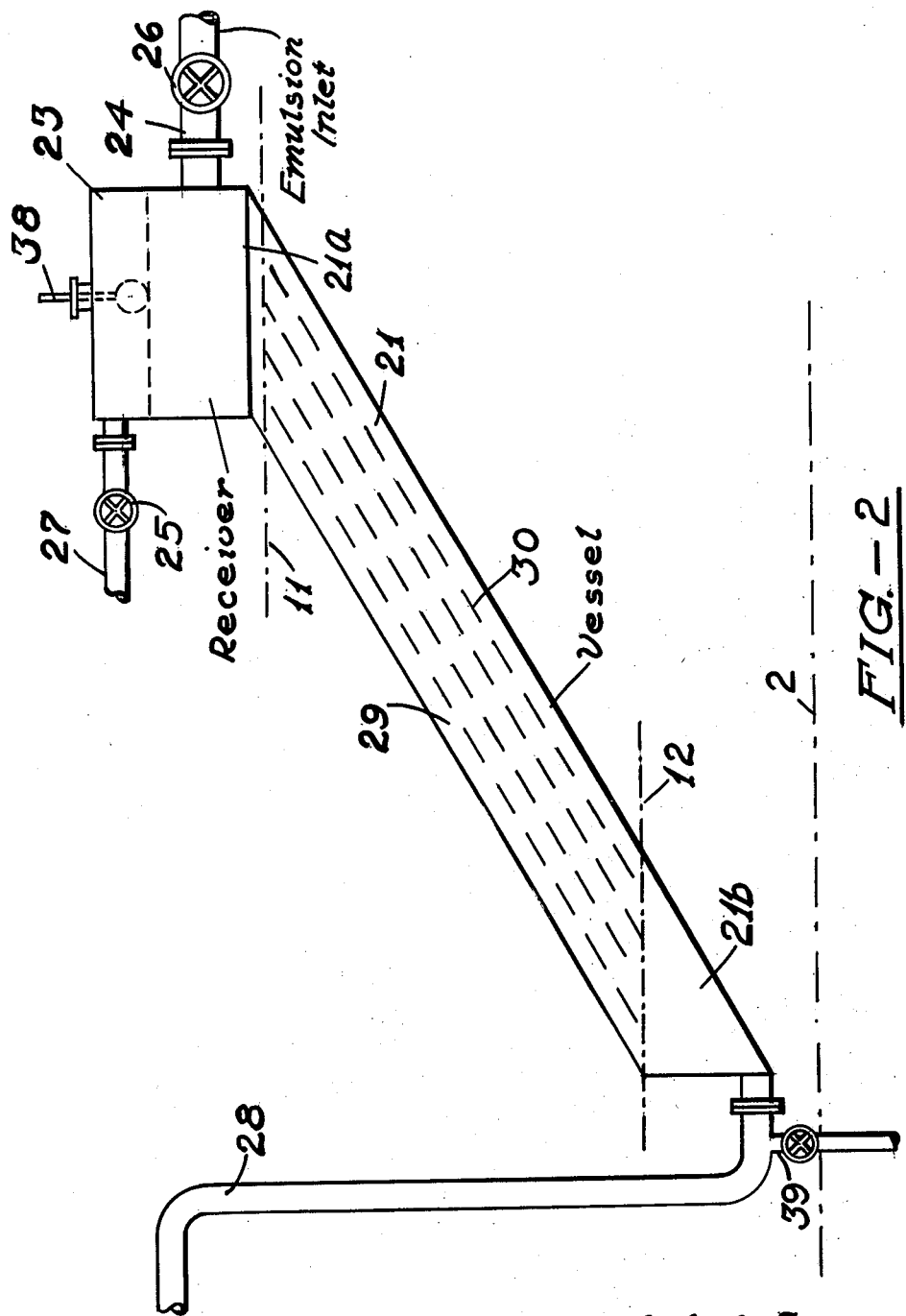
Figure 2 is a similar view of another form of the apparatus.

In the apparatus as shown by Fig. 2, the emulsion is introduced, by way of line 24 and valve 26, into a receiver 23 flowing downwardly therefrom through the vessel 21, as a plurality of streams through the narrow passageways 29, formed as by dividing plate members 30. These members 30 may be the same as the members 10 of Figs. 1 and 3, or other elements as shown in Figs. 4, 5, 6 and 7 may be substituted therefor. In any event, the members 30 are also disposed so as to provide passageways 29 terminating at their respective upper and lower ends in common planes 11 and 12, parallel to each other, and to the base plane 2. But when V-shaped members are employed, preferably they are not inverted as in Fig. 3.

The major portion of the material of higher specific gravity, such as sulfuric acid in an emulsion fed through the line 24, continues downwardly through the passageways 29, while the lighter material separates out therein and is returned countercurrently over the lower surfaces of the inclined plate members 30 into the receiver 23 where it collects in the upper portion of the receiver to be removed by way of line 27 and valve 25. A float gauge 38 or other liquid level indicator is provided for the same purposes as the gauge 18 of Figure 1.

The settled acid entering the lower chamber 21b is removed therefrom by way of drawoff line 28. As shown, this line is arranged so as to provide a trap by means of which an adequate head of liquid is maintained in the apparatus.

What is claimed is:

1. An apparatus for gravity separation of emulsions of materials substantially immiscible and of dissimilar specific gravities, comprising a vertical receiver chamber for the emulsified materials and the separated heavier component thereof, an inlet for emulsified materials opening into the upper portion of said chamber, an outlet for said separated heavier component opening from the lower portion of said chamber, a narrow, elongated, separator shell opening at one end directly into said chamber intermediate the inlet for emulsified materials, and the outlet for the separated heavier component, said shell extending angularly upward from said chamber and with reference to a substantially horizontal, common base plane, a plurality of shallow, elongated conduit elements extended longitudinally within said shell, terminating at each end thereof in common planes substantially parallel with each other and with said base plane, said ends with said shell defining chambered upper and lower end portions, the latter opening directly into said receiver chamber, separate conduit means for introducing emulsified materials through said receiver chamber inlet and for removing the separated heavier component through said receiver chamber outlet, conduit means communicating with the chambered upper end portion of said shell for withdrawal of the lighter component of said emulsified materials and means for maintaining a predetermined level of the heavier component in said chamber intermediate the opening of said shell into the chamber and said outlet for the heavier component.

2. Apparatus according to claim 1, in which said conduit members consist of a plurality of tubular elements substantially filling the shell between said upper and lower end portion, and longitudinally co-extensive with said shell.

3. An apparatus according to claim 1, in which said conduit elements consist of a plurality of inverted, substantially V-shaped plate members disposed laterally of the shell in close, vertically spaced relation one to another.

4. An apparatus according to claim 1, in which said conduit elements consist of a plurality of corrugated plate members, disposed laterally of the shell, the corrugations of each member being secured to a corresponding opposed portion of an adjoining member.

5. An apparatus according to claim 1, in which said conduit elements comprise a plurality of substantially flat plate members disposed laterally of the shell in closely spaced relation one to another, and a plurality of laterally spaced divider members disposed between said plate members and the shell respectively in right angular relationship thereto.

6. Apparatus according to claim 5, in which said plate and divider members are disposed to form a substantially uniform honeycomb pattern cross-sectionally of the shell.

FRANCIS M. ARCHIBALD.

REFERENCES CITED

The following references are of record in the file of this patent:

UNITED STATES PATENTS

| Number | Name | Date |
| --- | --- | --- |
| 1,690,537 | Hele-Shaw et al. | Nov. 6, 1928 |
| 1,804,743 | Cannon | May 12, 1931 |
| 1,864,511 | Jones | June 21, 1932 |
| 1,946,415 | Schmid | Feb. 6, 1934 |
| 2,214,248 | Hawley | Sept. 10, 1940 |
| 2,375,590 | Schonberg et al. | May 8, 1945 |
| 2,497,392 | Breukel | Feb. 14, 1950 |